United States Patent [19]

Bitsakis

[11] Patent Number: 5,375,502

[45] Date of Patent: Dec. 27, 1994

[54] FAST-ACTING VALVE FOR PROJECTIVE LAUNCHING SYSTEMS

[75] Inventor: Nicholas Bitsakis, Portsmouth, R.I.

[73] Assignee: The United States of America as represented by the Secretary of the Navy, Washington, D.C.

[21] Appl. No.: 169,277

[22] Filed: Dec. 20, 1993

[51] Int. Cl.$^5$ .................. F41F 3/10; B63G 1/00
[52] U.S. Cl. .................. 89/1.810; 114/238
[58] Field of Search .......... 137/625.37, 625.3; 251/30.01; 91/361; 89/1.810; 114/238, 319

[56] References Cited

U.S. PATENT DOCUMENTS

| | | | |
|---|---|---|---|
| 2,284,881 | 6/1942 | Scott-Paine | 114/238 |
| 4,310,143 | 1/1982 | Determan | 137/625.65 |
| 4,397,331 | 8/1983 | Medlar | 137/625.3 |
| 4,418,794 | 12/1983 | Manco | 91/448 |
| 4,523,538 | 6/1985 | Hollmann et al. | 114/238 |
| 4,757,879 | 7/1988 | Rita | 91/448 |
| 5,099,745 | 3/1992 | Hubbell et al. | 114/238 |
| 5,165,360 | 11/1992 | Moody | 114/319 |
| 5,200,572 | 4/1993 | Bissonnette et al. | 89/1.810 |
| 5,210,369 | 5/1993 | Cassidy | 89/1.810 |

Primary Examiner—David Brown
Attorney, Agent, or Firm—Michael J. McGowan; Prithvi C. Lall; Michael F. Oglo

[57] ABSTRACT

A fast acting valve for use in a stored energy projectile launching system. The valve has an inlet port for connection to a storage energy device, an outlet port for connection to a launching tube and an intermediate chamber. The interior of the valve seat communicates with one of the ports through a plurality of apertures that permit liquid to transfer between the ports. A cylindrical valve lies inside the cylindrical valve seat and sealingly, slidingly engages the interior of the cylindrical valve seat. A microprocessor-based control system provides a controlled velocity profile transfer of the valve between a first position in which the valve seals the ports and a second position in which the valve clears the ports.

18 Claims, 4 Drawing Sheets

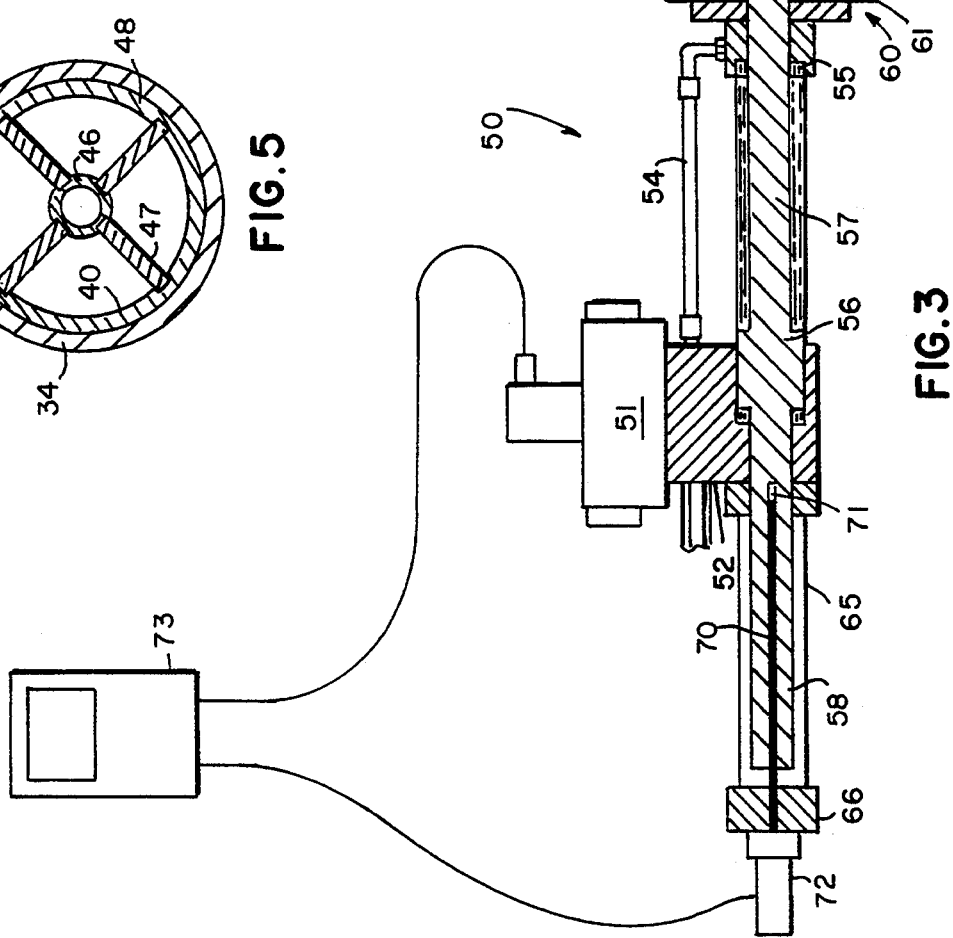

FAST-ACTING VALVE FOR PROJECTIVE LAUNCHING SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relate to fast-acting valves and more particularly to fast-acting valves adapted for use with projectile launching systems.

(2) Description of the Prior Art

U.S. Letters Pat. No. 4,848,210 discloses an energy storage device for use in association with projectile launching tubes in free flood compartments of a submarine hull. In these systems, a large quantity of water is stored in a reservoir under pressure. A closed valve isolates the reservoir from each launching tube. Opening the valve releases the stored water into the launching tube to eject the projectile.

In order for the water to transfer rapidly and without loss of pressure or force, it is necessary that valve have a large diameter and be fast-acting. A slow-opening valve will impede flow through the valve and limit the projectile ejection velocity.

U.S. Pat. No. 4,848,210 discloses a slide valve for isolating the pressurized storage device from the projectile launching tube. In practice a very complex mechanical system forms this slide valve. When operated rapidly, the components of this mechanical system can increase the level of vibrations and noise that transfer to and emanate from the structure, called "structure-borne vibrations". Generally a pressurized hydraulic cylinder operates the slide valve, and the energy input to the cylinder also can produce vibrations and noise.

U.S. Pat. No. 5,085,122 discloses an energy storage device that continuously communicates with the interior of a launching tube. More specifically, the output port of the energy storage device opens directly into a portion of the launching tube aft of a projectile position. After a projectile is loaded into the launching tube, a fluid operated piston extends transversely to engage and capture the aft end of the projectile. This locks the projectile in the launching tube. Then a pumping operator begins to pump water into the energy storage device, so the full pressure of the water in the energy device acts directly on the aft end of the projectile. Firing occurs when a valve diverts an incremental volume of water from the energy storage device into the fluid operated piston. The piston moves and releases the projectile whereupon the water in the energy storage device expels the projectile. The release piston used in this apparatus is subject to binding and jarring and can generate noise as it operates.

This valve mechanism is used with an "external" launcher, that is, a launcher in which a projectile is loaded from the exterior of a vessel or loaded from the discharge end of the barrel. "Internal" launching systems load the projectile from the breech end of the launching tube or barrel. These barrels may include internal structures, such as keyways, detent mechanisms, sleeves or other devices that are difficult, or in some cases impossible, to seal. Consequently, these launching tube internal structures, or barrel constraints, make it difficult, and in some cases impossible, to adapt such a valve mechanism to an internal launching system.

While U.S. Letters Pat. No. 4,848,210 discloses a system that can be test fired by ejecting a slug of water from the stored energy device through the launching tube and is adapted for repeated rapid firing, testing the apparatus that U.S. Pat. No. 5,085,122 requires the ejection of some mechanical equivalent to the end of the projectile. After either a test object or projectile is fired from the foregoing apparatus, another projectile must be loaded before repressurizing the energy storage device.

In accordance with another alternative, disclosed in co-pending U.S. patent application Ser. No. 08/129,726, filed Sep. 30, 1993, a stored energy device communicates directly with a launching tube. Axially spaced sealing mechanisms disposed in the launching tube on either side of the port engage a cylindrical sealing object that attaches to the aft end of a projectile and spans the sealing mechanisms. Prior to firing, water can be pumped into the energy storage device without ejecting the projectile. On firing, a valve opens to apply water pressure to the aft face of the sealing structure and displace it forward in the launching tube. When the sealing object clears the back sealing mechanism, water begins to flow directly from the energy storage device to the back side of the projectile thereby forcing the sealing object and the projectile out of the launching tube. In this system an incremental water volume from the energy storage device opens the flow port so this launching system does not require added energy. As only the valve contains moving parts, this system minimizes noise production. However, it still produces some noise. It also is not possible to test fire this system without ejecting the sealing object or equivalent structure. Moreover, this valve mechanism is not readily applicable to internal launching systems due to the previously described barrel constraints.

SUMMARY OF THE INVENTION

Therefore it is an object of this invention to provide a fast-acting valve that is particularly adapted for use with stored energy launching system.

Still another object of this invention is to provide a fast-acting valve that can be operated in a stored energy launching system with low noise generation.

Still another object of this invention is to provide a fast-acting valve for use in a stored energy launching system that can be applied to both internal and external launching systems.

Still another object of this invention is to provide a fast-acting valve in a stored energy launching system that enables test firings to be conducted without the ejection of any object.

It is still another object of this invention to provide a fast-acting valve structure for use in a stored energy launching system that enables repetitive launchings.

A fast-acting valve assembly constructed in accordance with this invention includes a barrier in a valve assembly housing intermediate input and output ports thereof that includes a number of passages at predetermined positions. A sliding valve in sealing engagement with the barrier blocks those passages in a first position and opens the passages in a second position. The sliding valve is adapted for being disposed in the liquid being controlled and has a low cross-section to the liquid during movement thereof. A programmably controlled drive moves the valve from it first to its second position according to a predetermined velocity profile to open the valve in a fast-acting fashion with velocity control.

In accordance with another aspect of this invention, a valve assembly for communicating between a stored energy device and a launching tube includes an inlet port, an outlet port and an intermediate chamber. A cylindrical barrier mounts in the chamber and has a plurality of ports therethrough at one end thereof. A cylindrical valve structure slides within the port in the cylindrical barrier in a sealed relationship to the barrier. In a first position the valve overlies the passages and blocks any liquid transfer between the inlet and outlet ports. In a second, axially displaced position, the valve opens the passages and allows flow between the inlet and outlet ports. The cylindrical valve presents a low cross-sectional area to any liquid within the cylindrical barrier whereby the cylindrical valve can move quickly and with a minimal generation of turbulence. A programmably-controlled servo drive moves the sliding valve from its blocking position to its open position with a predetermined velocity profile.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 3 depicts the fast-acting valve assembly of FIG. 1 in a fully opened position;

FIG. 5 is a cross section of a sliding cylindrical valve useful in the valve assembly of FIGS. 1 through 3;

DESCRIPTION OF THE PREFERRED EMBODIMENT

Figure 1:
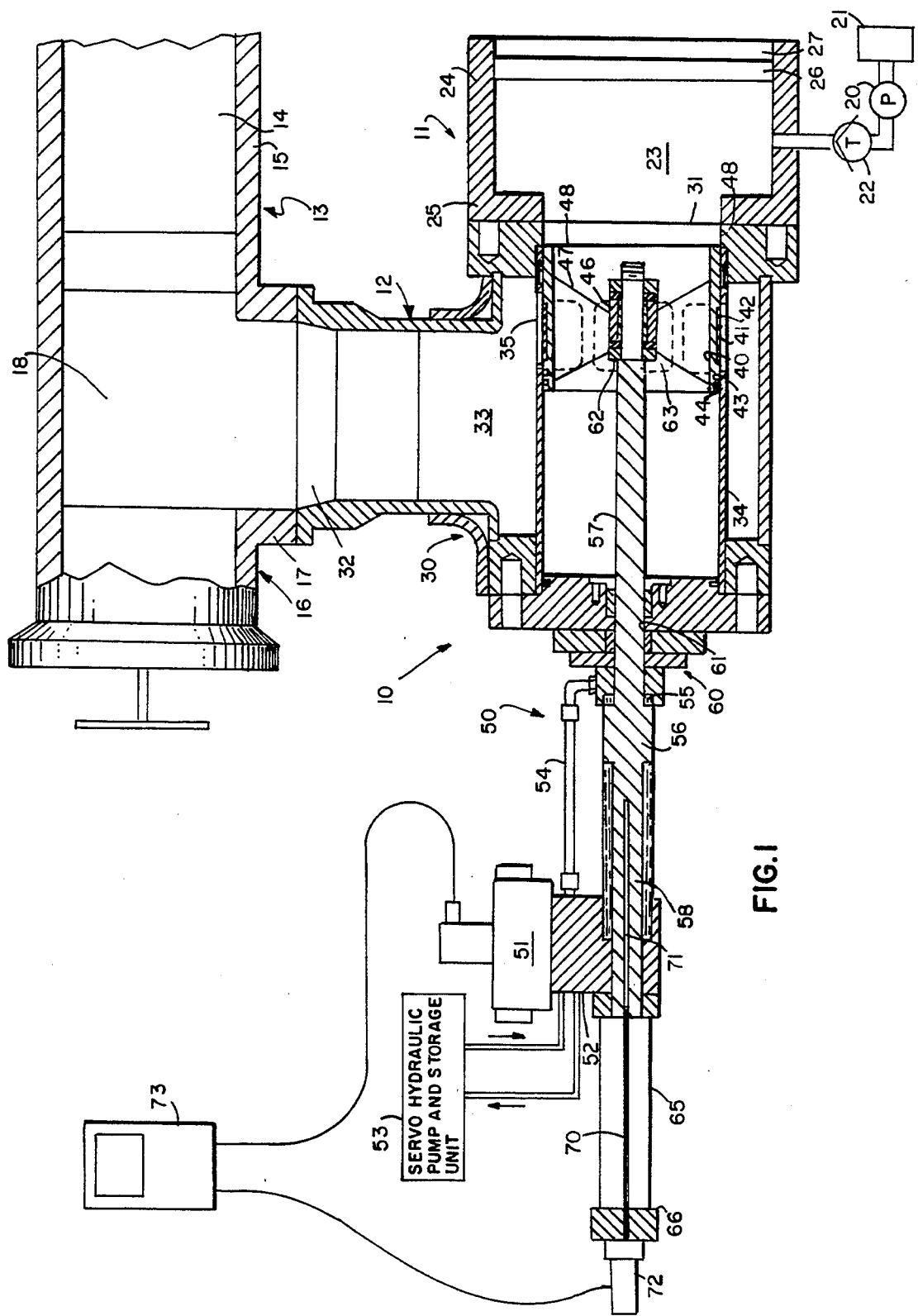
FIG. 1 is cross-sectional view that schematically depicts a stored energy launching system utilizing a fast-acting valve assembly constructed in accordance with this invention and oriented in a blocking position.

FIG. 1. depicts one form of a projectile launching system 10 embodying this invention. The major components of this system include a stored energy source 11, a fast-acting valve assembly 12 constructed in accordance with this invention, a launching assembly 13 and a projectile 14.

The launching assembly 13 comprises a launching tube 15 for positioning and containing the projectile 14. Although shown as being disposed along a horizontal axis, the launching tube 15 can have any orientation in space. This particular figure depicts an internal launching system in which the launching assembly 13 includes a breech end 16 for receiving the projectile 14. The invention is equally applicable to external systems using muzzle loading. A port 17 communicates with the valve 12 and opens into a breech cavity 18 located in the launching tube 15 behind the projectile 14.

The stored energy source 11, shown by schematic representation in FIG. 1, includes a pump 20 that displaces water from a source 21 through a check valve 22 into a reservoir 23 in a container 24. A port 25 communicates with the valve assembly 12. In this schematic, the container 24 includes a movable piston 26. Water pumped into the reservoir 23 displaces the piston 26 away from the port 25 and compresses air in closed volume 27 to produce a pneumatic restoring force. As an alternative, an elastomer material, that expands as the liquid in the elastomer material is pressurized, can be substituted for the piston 26. As the material expands it generates an elastic restoring force. These and other stored energy systems are known in the art. This embodiment is described for purposes of background and environment.

During normal operation, the valve 12 is closed and the launching tube 15 may be emptied. A projectile 14 is loaded into the launching tube 15. Simultaneously the pump 20 displaces water into the reservoir 24 to displace the piston 26 and compress the air 27 or stretch the elastomer thereby to produce a restoring force. Once the pressure has reached a predetermined level, the pump 20 stops. The check valve 22 prevents any pressure loss. When the valve 12 opens, the restoring force propels the water through the valve system 12 into the volume 18 and displaces the projectile 14 out the muzzle end of the launching tube 15.

Figure 2:
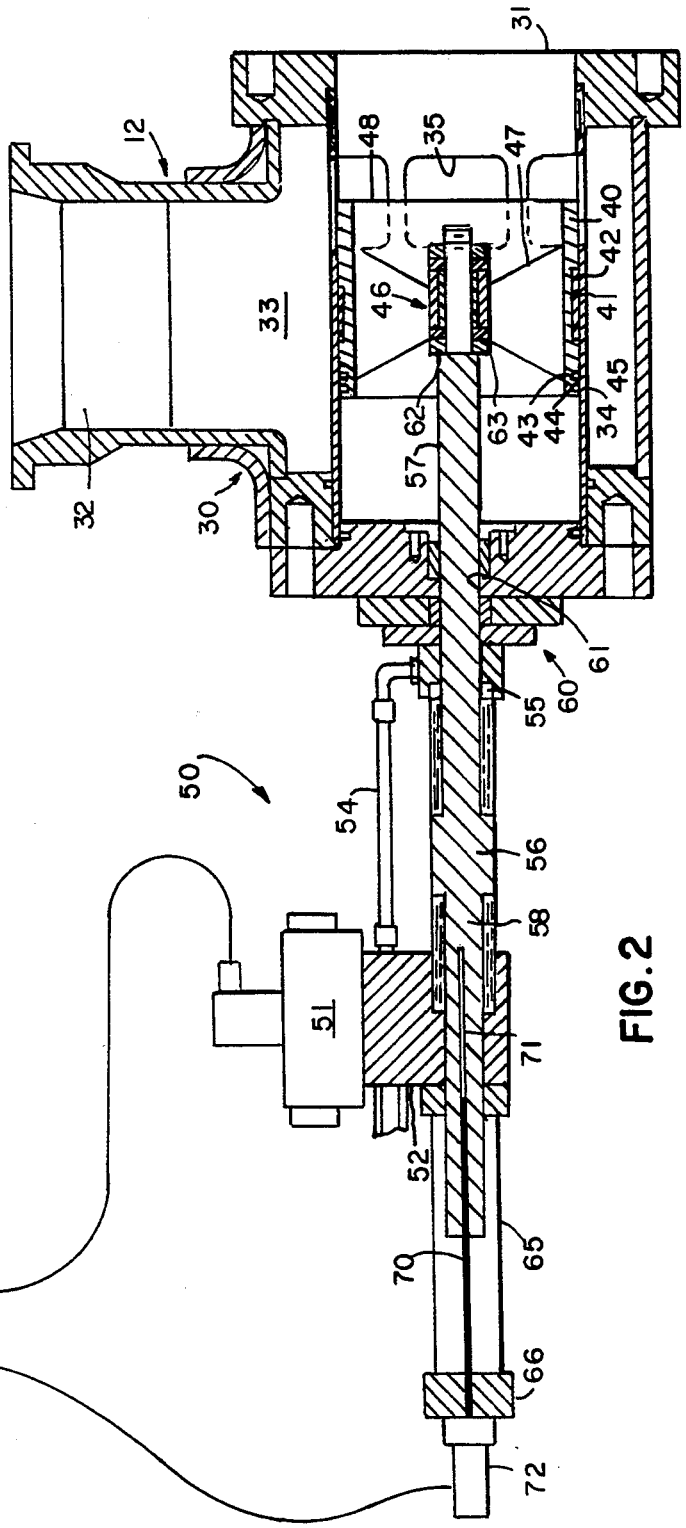
FIG. 2 depicts the fast-acting valve assembly of FIG. 1 at a partially opened position.

The valve assembly 12 shown in FIGS. 1 through 3 provides a controlled fast-acting valve opening operation. That is, the valve effectively moves from a fully closed to a fully open position effectively in an instantaneous manner. However, the valve operates according to a predetermined velocity profile to minimize the production of vibration and noise during test operations or firing operations.

More particularly, as shown in FIGS. 1 through 3, the valve assembly 12 includes a valve assembly housing 30 with a first port 31 and a second port 32. In this particular embodiment the first port 31 constitutes an inlet port; the second port 32, an outlet port. A central chamber 33 between the first and second ports 31 and 32 contains a thin cylindrical structure that acts as a valve seat 34. A plurality of passages or ports 35 are formed about the circumference of the cylindrical valve seat 34 adjacent the first port 31. These ports provide a passage between the first and second ports 31 and 32.

Normally the total area of all the ports 35 will be greater than the cross-section of either the first or second ports 31 and 32. In a preferred embodiment the cross section of the ports 35 will be approximately 120% of the port cross section. This allows water to flow between the first and second ports 30 and 31 without any effective restriction. The cylindrical valve seat 34 therefore constitutes a barrier. This barrier is intermediate the first and second ports and prevents any transfer of water except through the passages that are located at the predetermined positions through that barrier (i.e., adjacent the first port 31).

Referring again to FIGS. 1 and 4, a groove 36 formed intermediate the ports 35 and the end of the cylinder 34 at the first port 31 carries a sealing structure 37. In a preferred embodiment, the sealing structure 37 comprises a lip seal structure having an 0-ring spring 38 and sealing lip member 39. Such seals are known in the art.

Referring to FIGS. 1 through 3, a cylindrical valve 40 mounts coaxially with the cylindrical valve seat 34 for axial displacement from a closed position (FIG. 1) in which the valve 40 overlies the ports 35, through an intermediate position (FIG. 2) to a closed position (FIG. 3). In the open position, the valve 40 is fully retracted and completely clears the ports 35.

Figure 4:
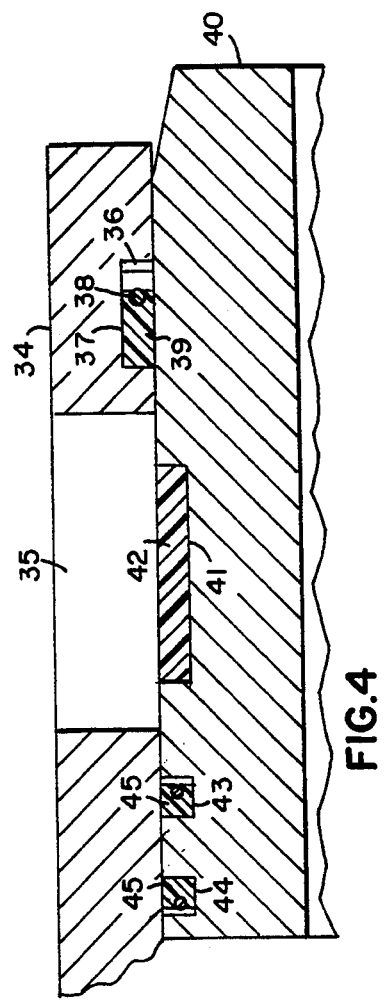
FIG. 4 is a partial cross section of the valve of FIGS. 1 through 3 that depicts a sealing structure.

As shown in FIGS. 1 and 4, the valve 40 includes a central circumferentially extending groove 41 formed in an outer surface thereof for containing a Teflon ® or similarly constructed bushing 42. This bushing 42 facilitates the longitudinal displacement of the structure with minimal noise. At the end of the valve 40 displaced from the first port 31, each of a pair of circumferentially extending grooves 43 and 44 carry an activated lip seal 45. The seals 45 face in opposite directions to produce a bidirectional sealing structure.

As can be more readily seen from referring to FIGS. 1 and 5, the cylindrical valve 40 mounts on a central hub 46 by means of an open web structure 47 that essentially constitutes a plurality of thin, radially extending arms. As will be apparent from viewing FIG. 5, the valve 40 has a low cross-section to any liquid within the cylindrical valve seat 34 so rapid movement of the valve 40 does not introduce significant turbulence within the valve seat 34. The low cross section further minimizes the energy required to displace the cylindrical valve 40 between the positions shown in FIGS. 1 through 3. Minimizing turbulence and energy input minimizes vibration and noise production.

Figure 6:
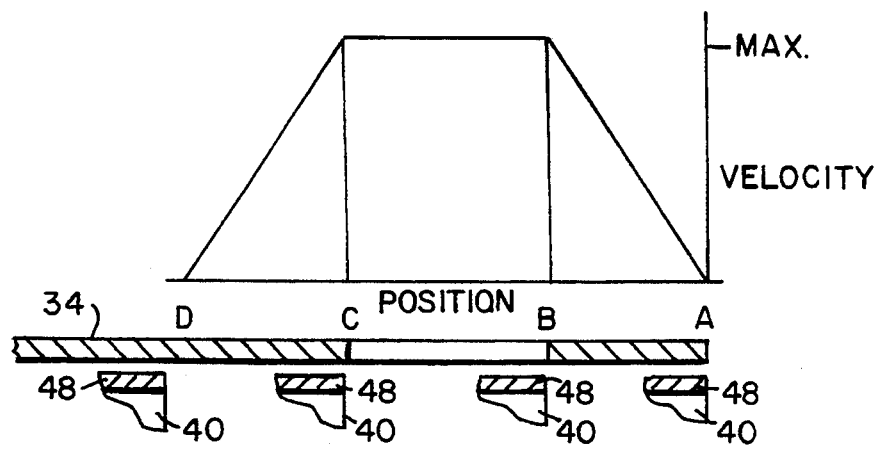
FIG. 6 is a diagram that is useful in understanding this invention.

In accordance with this invention it is important to control the velocity of the valve 40 particularly as it opens. A drive mechanism 50 moves the valve 40 from its position shown in FIG. 1 according to a predetermined velocity profile. FIG. 6 discloses one such profile under which the drive mechanism 50 accelerates the valve 40 to a maximum velocity (MAX) as the valve moves from its fully closed position (position A in FIG. 6) to a position where end 48 of the valve just reaches the edge of the ports 35 (position B). The drive mechanism 50 continues to move the valve at an essentially constant velocity until the end 48 passes the left edge of the ports 35 (position C). Then the drive mechanism 50 decelerates and stops the valve 40 at position D. At position D the valve 40 does not reach any mechanical stop. Other profiles can be used to optimize device ejection velocity and valve vibration. Consequently, this control provides quiet valve operation and introduces minimal noise into the firing operation.

More specifically, the drive mechanism 50 includes a servo control valve 51, a hydraulic valve manifold 52 and a hydraulic pump and storage unit 53. This mechanism 50 controls the flow of hydraulic fluid through a tube 54 into a chamber 55 to displace a piston 56 away from the valve assembly 12 to the left as shown in the FIGS. 1 through 3. Two links, or shafts, extend axially in opposite directions from the piston 56 along a drive axis. A drive link 57 extends from the piston 56 into the valve assembly 12 while a second drive link 58 extends from the piston 56 in the opposite direction. A sealing mounting structure 60 connects the drive mechanism 50 to the valve housing 30 and the drive link 57 extends through the chamber 55 coaxially with the valve seat 34 and cylindrical valve 40.

Figure 7:
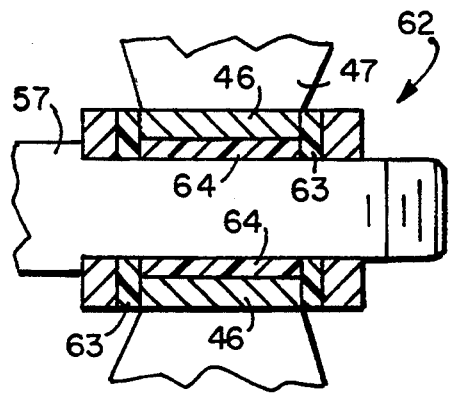
FIG. 7 is another cross section of a sliding cylindrical valve that is useful in the valve assembly of FIGS. 1 through 3.

An end fitting structure 62 on the drive link 57 couples to the central hub 46 of the cylinder 43 thereby to enable the drive mechanism to displace the valve 40 within the valve seat 34. In a preferred embodiment shown in FIG. 7, elastomer washers 63 and an elastomer sleeve 64 mount between the end fitting 62 and the central hub 46 to allow the system to operate in a self-centering fashion. This minimizes any propensity of the cylindrical valve 40 to bind as a result of any deviations of the drive link 57 from the axis. This structure and the Teflon ® bushing 42 act to minimize noise generation.

Referring again to FIGS. 1 through 3, the drive system limits the valve 40 in a range of positions that are spaced from either end of the cylindrical valve seat 34. More specifically, the left shaft 58 from the piston 56 displaces into a vented air cylinder 65. An end fitting 66 on the air cylinder 64 carries a magnetostrictive position sensor 70 that extends into an axially extending bore 71 in the shaft 58. A transducer 72 produces position signals that indicate the axial position of the shaft 58. A microprocessor-based controller 73 monitors this position signal to determine, on an incremental and iterative basis, the appropriate velocity for each incremental displacement and produces the appropriate signals for causing the servo control valve 51 to produce the corresponding displacement of the piston 56.

In operation, the microprocessor-based controller 73 closes the valve 40 to the position shown in FIGS. 1 and position A of FIG. 6. When the valve 40 is closed, the pump 20 fills the reservoir 23. Although water will fill the interior the valve seat 33, the seals and 45 prevent water from passing through the ports 35. Thus, even though the stored energy system 11 is charged, it is possible to load a projectile into the launching tube from either an interior portion of the launching vehicle such as through a breech end 16 or externally from the launching vehicle as through the muzzle of the launching tube 15.

When the microprocessor-based controller 71 receives the firing signal, it energizes the servo 51 to accelerate the piston 56, shaft 57 and valve 40 away from the first port 31 of the valve assembly 12. The velocity profile is controlled so that the valve 40 reaches maximum velocity as the end 48 clears the seal 36 at position B in FIG. 6. The valve 40 travels at maximum velocity through the intermediate portion shown in FIG. 2 as it clears the ports 35 and water moves into the chamber 18 to displace the projectile 14 as shown in FIG. 3. At this maximum velocity, the end 48 of the valve 40 clears the ports 35 in milliseconds, so the ports open essentially instantaneously. Once the end 48 clears the ports 35, the microprocessor-based controller 73 and servo control 51 decelerate the valve 40 in a controlled manner and stop the valve 40 before it strikes any portion of the valve assembly 12.

After firing, the microprocessor-based controller 73 resets the system by displacing the valve 40 to the position shown in FIG. 1, again under controlled conditions, but usually according to a different velocity profile. Once the valve 40 closes the ports 35, the stored energy device 11 shown in FIG. 1 can be recharged independently of any projectile in the launching tube. Further noise reductions can be realized in internal launching system applications if, after loading the projectile in the launching tube through the breech end 16, water fills the valve assembly chamber 33 outside the valve seat 34 and the chamber 18.

This apparatus can be test fired. That is, it is possible to cycle the valve assembly 12 through a full operation. No projectile is required in the launching tube. Only water is ejected from the launching assembly.

Therefore in accordance with the objects of this invention, the valve assembly 12 shown in each of the FIGS. 1 through 3 constitutes a fast-acting valve that is particularly adapted for the large aperture pipes associated with projectile launching systems. The cylindrical valve 40, the piston 56 with its shafts 57 and 58 and the hydraulic fluid within the hydraulic drive system 50 constitute a minimal mass. Consequently, large changes in velocity do not produce correspondingly large momentum changes. The low cross section of web structure 47 minimizes the force necessary for transporting the valve 40 even at high speeds from one position to another. This reduces the energy input required for moving the valve and minimizes noise production. If the seals 36 and 45 are bi-directional seals, the system can operation bi-directionally. For example in this particular embodiment the first port 31 constitutes an inlet port. The system will operate with equal efficiency if the second port 32 is the inlet port and the first port 31 is the outlet port. This adapts the valve to a variety of applications without having an increase in the number of physical structures that might be needed. Other applications may incorporate unidirectional sealing structures.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. In a valve assembly for controlling the transfer of liquid between an input port and an output port in a valve assembly housing, the improvement of a fast acting valve means for enabling and disabling the transfer comprising:
    barrier means mounted in said valve assembly housing for separating the input and output ports, said barrier means including passage means located at a predetermined position of said barrier means for enabling liquid to transfer past said barrier means;
    sliding valve means in sealing engagement with said barrier means for blocking and opening said passage means, said sliding valve means having a low cross section to the liquid during movement between the blocking and open positions;
    shaft means extending through said valve assembly housing for connection to said sliding valve means; and
    displacement means connected externally of said valve assembly housing for moving said shaft means along a drive axis between first and second positions according to a predetermined velocity profile, said shaft means thereby displacing said sliding valve means from its blocking position to its open position in a controlled, fast acting fashion.

2. Fast acting valve means as recited in claim 1 additionally including flexible connection means for interconnecting said shaft means and said sliding valve means.

3. Fast acting valve means as recited in claim 1 wherein said displacement means comprises hydraulic fluid operating piston means attached to said shaft means, servo means for controlling the flow of hydraulic fluid to said piston means and programmably, controlled means for operating said servo means according to the predetermined velocity profile.

4. Fast acting valve means as recited in claim 3 wherein said hydraulically operated piston is sealed with respect to said valve assembly.

5. Fast acting valve means as recited in claim 1 wherein said barrier means has a cylindrical form that is coaxial with the drive axis and said sliding valve means has a cylindrical form and is coaxial with and interiorly mounted inside said barrier means.

6. Fast acting valve means as recited in claim 5 wherein said passage means is located at one end of said barrier means.

7. Fast acting valve means as recited in claim 5 wherein said passage means is located at the end of said barrier means that is proximate the input port.

8. Fast acting valve means as recited in claim 5 additionally comprising sliding seal means between said barrier means and said sliding valve means for producing a sealed barrier between the input and output ports when said slide valve means is in its blocking position.

9. In an apparatus for ejecting a projectile in a liquid medium including launching tube means for guiding the projectile during launch and stored energy source means for discharging liquid under pressure into said launching tube means to effect a launch, the improvement of fast acting valve means for controlling the discharge of liquid from said stored energy source into said launching tube means, said valve means comprising:
    valve assembly housing means including first and second flange means for connection respectively to said stored energy source means and said launching tube means and chamber means intermediate said first and second flange means;
    barrier means mounted in said valve assembly housing means for separating said chamber means, said barrier means including passage means located at a predetermined position of said barrier means for enabling liquid to transfer past said barrier means;
    sliding valve means in sealing engagement with said barrier means for closing said passage means in a blocking position and opening said passage means in an open position, said sliding valve means being disposed in the liquid and having a low cross section to the liquid during movement between the blocking and open positions;
    axially extending shaft means for connection to said sliding valve means; and
    displacement means for moving said shaft means in a fast acting manner between first and second axial positions along a drive axis according to a predetermined velocity profile, said shaft means moving said sliding valve means from its blocking to its open position in a controlled, fast acting fashion thereby to enable said stored energy source means to transfer liquid to said launching tube means for launching the projectile.

10. Projectile ejection apparatus as recited in claim 9 including flexible connection means for interconnecting said shaft means and said sliding valve means.

11. Projectile ejection apparatus as recited in claim 9 wherein said displacement means comprises hydraulic fluid operating piston means attached to said shaft means, servo means for controlling the flow of hydraulic fluid to said piston means and programmably controlled means for operating said servo means according to the predetermined velocity profile.

12. Projectile ejection apparatus as recited in claim 11 wherein said hydraulically operated piston is sealed with respect to said valve assembly.

13. Projectile ejection apparatus as recited in claim 9 wherein said barrier means has a cylindrical form that is coaxial with the drive axis and said sliding valve means has a cylindrical form and is coaxial with and interiorly mounted with respect to said barrier means.

14. Projectile ejection apparatus as recited in claim 13 wherein said passage means is located at one end of said barrier means.

15. Projectile ejection apparatus as recited in claim 13 wherein said passage means is located at the end of said barrier means that is proximate the input port.

16. Projectile ejection apparatus as recited in claim 13 additionally comprising sliding seal means between said barrier means and said sliding valve means for producing a sealed barrier between the input and output ports when said slide valve means is in its blocking position.

17. Projectile ejection apparatus as recited in claim 13 additionally comprising web-shaped means having a low transverse cross section for interconnecting said sliding valve means and said shaft means.

18. Projectile ejection apparatus means as recited in claim 17 additionally comprising elastomeric connections between said shaft means and said web-shaped means for enabling said shaft means and said sliding valve means to move along displaced axes.

* * * * *